United States Patent
Ryu et al.

(10) Patent No.: US 9,967,061 B2
(45) Date of Patent: May 8, 2018

(54) METHOD AND APPARATUS FOR RETRANSMISSION IN WIRELESS LAN

(71) Applicant: LG ELECTRONICS INC., Seoul (KR)

(72) Inventors: Kiseon Ryu, Seoul (KR); Wookbong Lee, Seoul (KR); Jinsoo Choi, Seoul (KR); Jeongki Kim, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/125,107

(22) PCT Filed: Nov. 6, 2014

(86) PCT No.: PCT/KR2014/010634
§ 371 (c)(1),
(2) Date: Sep. 9, 2016

(87) PCT Pub. No.: WO2015/137591
PCT Pub. Date: Sep. 17, 2015

(65) Prior Publication Data
US 2016/0380727 A1    Dec. 29, 2016

Related U.S. Application Data

(60) Provisional application No. 61/950,226, filed on Mar. 10, 2014.

(51) Int. Cl.
*H04W 4/18*    (2009.01)
*H04J 3/24*    (2006.01)
(Continued)

(52) U.S. Cl.
CPC .............. *H04L 1/1809* (2013.01); *H04L 1/18* (2013.01); *H04L 5/0055* (2013.01); *H04L 45/74* (2013.01);
(Continued)

(58) Field of Classification Search
None
See application file for complete search history.

(56) References Cited

U.S. PATENT DOCUMENTS

2006/0120339 A1    6/2006    Akiyama et al.
2006/0153152 A1    7/2006    Kondylis et al.
(Continued)

FOREIGN PATENT DOCUMENTS

KR    100861928 B1    10/2008
KR    1020090090669 A    8/2009
KR    101242952 B1    3/2013

*Primary Examiner* — Alpus H Hsu
*Assistant Examiner* — Camquyen Thai
(74) *Attorney, Agent, or Firm* — Lee Hong Degerman Kang Waimey

(57) ABSTRACT

Disclosed are a method and an apparatus for retransmission in a wireless LAN. The method for retransmission in a wireless LAN may comprise the steps in which: an STA receives an RTS frame from an AP; the STA transmits a CTS frame to the AP in response to the RTS frame; the STA receives an initial data frame from the AP after transmitting the CTS frame; if decoding on the initial data frame is impossible, the STA transmits a retransmission request frame to the AP; and the STA receives a retransmission data frame from the AP in response to the retransmission request frame.

8 Claims, 14 Drawing Sheets

(51) Int. Cl.
*G08C 25/02* (2006.01)
*H04L 1/18* (2006.01)
*H04L 5/00* (2006.01)
H04L 12/741 (2013.01)
H04W 84/12 (2009.01)
H04W 88/02 (2009.01)
H04W 88/08 (2009.01)

(52) U.S. Cl.
CPC ............ *H04W 84/12* (2013.01); *H04W 88/02* (2013.01); *H04W 88/08* (2013.01)

(56) References Cited

U.S. PATENT DOCUMENTS

| | | |
|---|---|---|
| 2006/0256743 A1 | 11/2006 | Lee et al. |
| 2007/0133459 A1 | 6/2007 | Kim et al. |
| 2008/0002615 A1* | 1/2008 | Nakajima ............. H04L 1/1614 370/328 |
| 2012/0213308 A1* | 8/2012 | Merlin .................. H04L 1/1621 375/295 |
| 2012/0263091 A1* | 10/2012 | Kim ..................... H04B 7/0452 370/312 |
| 2013/0301569 A1* | 11/2013 | Wang .................... H04L 5/0055 370/329 |
| 2014/0079016 A1* | 3/2014 | Dai ...................... H04L 5/0041 370/330 |

\* cited by examiner

FIG. 1
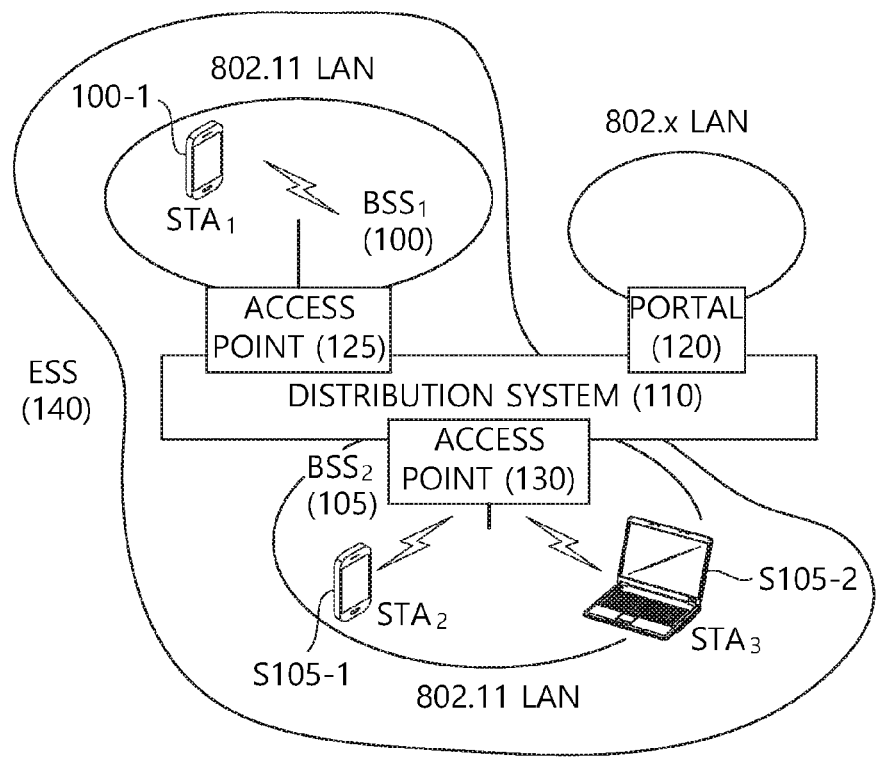
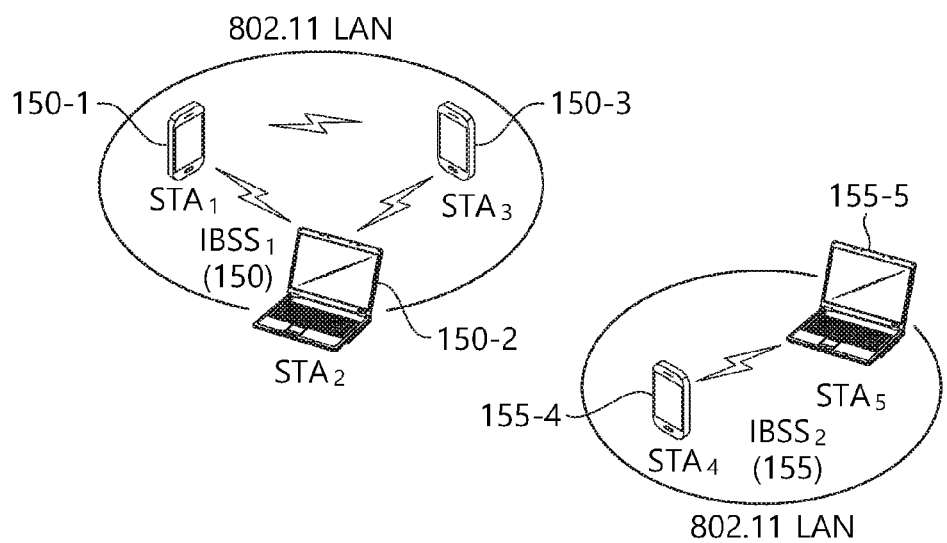

FIG. 6
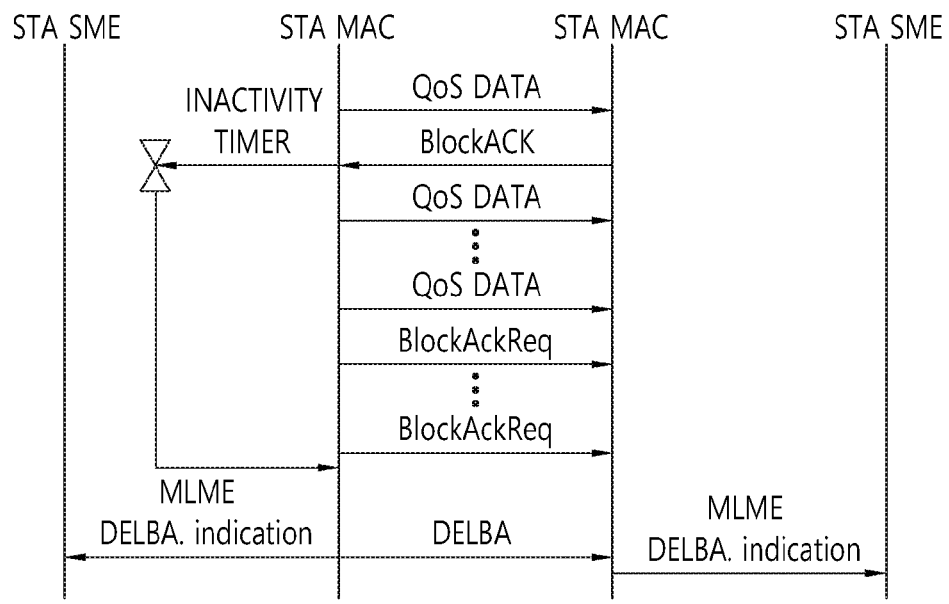
(a) TRANSMITTING SIDE
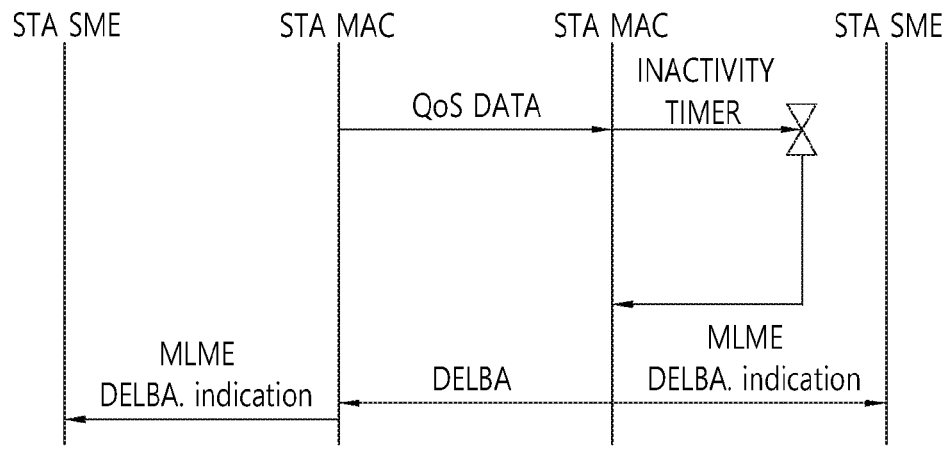
(b) RECEIVING SIDE

FIG. 7
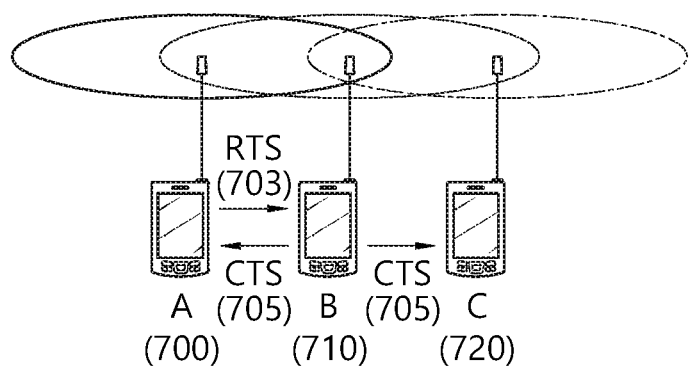
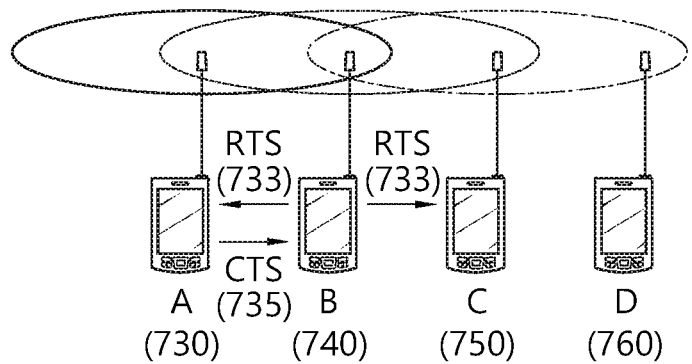

METHOD AND APPARATUS FOR RETRANSMISSION IN WIRELESS LAN

CROSS-REFERENCE TO RELATED APPLICATIONS

This application is the National Stage filing under 35 U.S.C. 371 of International Application No. PCT/KR2014/010634, filed on Nov. 6, 2014, which claims the benefit of U.S. Provisional Application No. 61/950,226, filed on Mar. 10, 2014, the contents of which are all hereby incorporated by reference herein in their entirety.

BACKGROUND OF THE INVENTION

Field of the Invention

The present invention relates to wireless communication, and more particularly, to a method and an apparatus for retransmission in a wireless local area network (WLAN).

Related Art

The Wireless Next Generation Standing Committee (WNG-SC) of the IEEE 802.11 is an ad-hoc committee dealing with development of standard specifications of the next-generation WLAN technology in a long-term perspective.

At the IEEE meeting held on March 2013, Broadcom pointed out on the basis of the history of WLAN standardization that next-generation WLAN specifications following the IEEE 802.11ac should be discussed within the first half of the year of 2013, where the effective term of the IEEE 802.11ac standard is ended. Agreeing with the needs for the next-generation technology and standardization thereof, the WNG-SC has approved the motion for forming a study group for the next-generation WLAN at the IEEE meeting held on March 2013.

The technical scope of the IEEE 802.11ax mainly dealt with in the study group for the next-generation WLAN which is called the IEEE 802.11ax or High Efficiency WLAN (HEW) includes: 1) improvement of the 802.11 PHY (Physical) layer and Medium Access Control (MAC) layer at the frequency bands of 2.4 GHz, 5 GHz, and so on; 2) improvement of spectrum efficiency and area throughput; and 3) improvement of performance in indoor and outdoor environments such as an environment with interference sources, a dense heterogeneous network environment, and an environment with high user loads. A use-case scenario mostly used in the IEEE 802.11ax assumes an environment populated with a large number of Access Points (APs) and stations (STAs), and the IEEE 802.11ax is concerned with technologies capable of improving spectrum efficiency and area throughput under such an environment. In particular, the IEEE 802.11ax has an interest in improving actual performance in outdoor environments traditionally not having been dealt with in the existing WLAN specifications, as well as performance improvement in indoor environments.

The IEEE 802.11ax has great interests in such scenarios as those including wireless office, smart home, stadium, hotspot, or building/apartment, and on the basis of the corresponding scenarios, technical specifications capable of improving system performance in an environment populated with a large number of APs and STAs are being discussed.

It is expected that the IEEE 802.11ax will be more actively involved in the discussion about improvement of system performance in an Overlapping Basic Service Set (OBSS) environment, performance enhancement in an outdoor environment, and cellular off-loading than performance enhancement of a single link for one Basic Service Set (BSS). Such direction of the IEEE 802.11ax indicates that the next-generation WLAN technology is going to have technical specifications the scope of which overlaps with that of mobile communication technology. Taking into account the current situation where mobile communication and WLAN technologies are being investigated together in the areas of small cell and Direct-to-Direct (D2D) communication, technical and entrepreneurial fusion of the next-generation WLAN and mobile communication will be conducted more actively.

SUMMARY OF THE INVENTION

The present invention provides a method for retransmission in a wireless LAN.

The present invention also provides an apparatus for performing a retransmission procedure in a wireless LAN.

In one aspect, provided is a retransmission method in a wireless LAN. The method includes receiving, by a station (STA), a request to send (RTS) frame from an access point (AP); transmitting, by the STA, a clear to send (CTS) frame to the AP as a response to the RTS frame; receiving, by the STA, an initial data frame from the AP after transmitting the CTS frame; transmitting, by the STA, a retransmission request frame to the AP when decoding the initial data frame is impossible; and receiving, by the STA, a retransmission data frame from the AP as a response to the retransmission request frame, wherein the retransmission data frame is a retransmission frame for the initial data frame.

In another aspect, provided is a station (STA) performing retransmission in a wireless LAN. The STA includes a radio frequency (RF) unit implemented to transmit or receive a radio signal; and a processor operatively connected with the RF unit, wherein the processor is implemented to receive a request to send (RTS) frame from an access point (AP), transmit a clear to send (CTS) frame to the AP as a response to the RTS frame, receive an initial data frame from the AP after transmitting the CTS frame, transmit a retransmission request frame to the AP when decoding the initial data frame is impossible, and receive a retransmission data frame from the AP as a response to the retransmission request frame, and the retransmission data frame is a retransmission frame for the initial data frame.

When transmission of a frame is unsuccessful due to a low signal to noise ratio (SINR), data transmission efficiency in a wireless LAN can be increased through hybrid automatic retransmit quest (HARQ) based retransmission.

BRIEF DESCRIPTION OF THE DRAWINGS

FIG. 1 is a conceptual view illustrating the structure of a wireless local area network (WLAN).

FIG. 6 illustrates a block ACK operation.

FIG. 7 is a conceptual view illustrating a method for transmitting and receiving an RTS frame and a CTS frame in order to solve a hidden node problem and an exposed node problem.

DESCRIPTION OF EXEMPLARY EMBODIMENTS

FIG. 1 is a concept view illustrating the structure of a wireless local area network (WLAN).

The upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

The lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
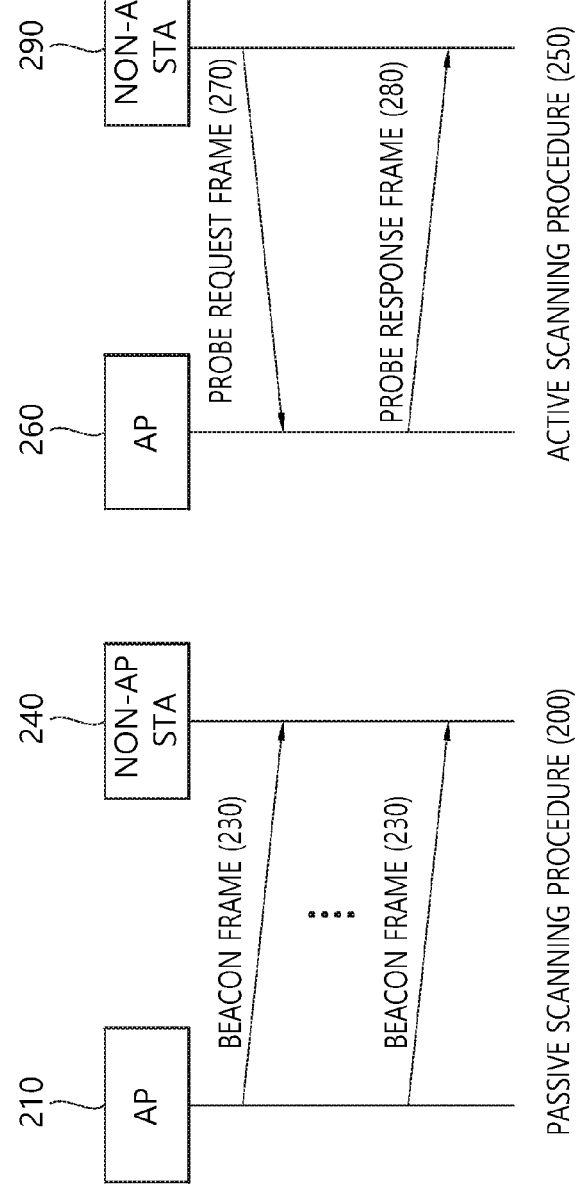
FIG. 2 is a conceptual view illustrating a scanning method in the wireless LAN.

FIG. 2 is a conceptual view illustrating a scanning method in the wireless LAN.

Referring to FIG. 2, the scanning method may be divided into passive scanning 200 and active scanning 250.

Referring to the left part of FIG. 2, the passive scanning 200 may be performed by a beacon frame 230 periodically broadcasted by an AP 200. The AP 200 of the wireless LAN broadcasts the beacon frame 230 to a non-AP STA 240 at a specific period (for example, 100 msec). The beacon frame 230 may include information on a current network. The non-AP STA 240 receives the periodically broadcasted beacon frame 230 to scan the AP 210 and a channel to perform an authentication/association process by receiving the network information.

In the passive scanning method 200, the non-AP STA 240 just receives the beacon frame 230 transmitted by the AP 210 without transmitting the frame. Therefore, the passive scanning 200 has an advantage in that overall overhead generated due to transmission/reception of data in the network is small. However, since scanning cannot but be passively performed in proportion to the period of the beacon frame 230, a time required for performing the scanning relatively increases as compared with the active scanning method. Detailed description of the beacon frame is disclosed in Beacon Frame at Clause 8.3.3.2 of IEEE Draft P802.11-REVmb™/D12, November 2011 'IEEE Standard for Information Technology Telecommunications and information exchange between systems—Local and metropolitan area networks—Specific requirements Part 11, Wireless LAN Medium Access Control (MAC) and Physical Layer (PHY) Specifications (hereinafter, referred to as IEEE 802.11)' disclosed in November 2011. In the IEEE 802.11ai, a beacon frame having another format may be additionally used and the beacon frame may be referred to as a fast initial link setup (FILS) beacon frame. Further, a measurement pilot frame may be used in a scanning procedure of a frame including only partial information of the beacon frame. The measurement pilot frame is disclosed in IEEE 802.11 8.5.8.3 measurement pilot format.

Further, a FILS discovery frame may be defined. The FILS discovery frame as a frame transmitted at a transmission period of the beacon frame in each AP may be a frame transmitted at a shorter period than the beacon frame. That is, the FILS discovery frame is a frame transmitted at a period having a smaller value than the transmission period of the beacon frame. The FILS discovery frame may include identifier information (SSID and BSSID) of the AP transmitting a detection frame. The FILS discovery frame is transmitted before the beacon frame is transmitted to the STA, and as a result, the STA may discover that the AP is present in the corresponding channel in advance. An interval at which the FILS discovery frame is transmitted in one AP is referred to as a FILS discovery frame transmission interval. The FILS discovery frame including some of the information included in the beacon frame may be transmitted.

Referring to the right part of FIG. 2, in the active scanning 250, a non-AP STA 290 transmits a probe request frame 270 to an AP 260 to dominantly perform scanning.

The AP 260 receives the probe request frame 270 from the non-AP STA 290 and thereafter, may transmit a probe response frame 280 including the network information to the non-AP STA 290 after waiting for a random time in order to prevent a frame collision. The non-AP STA 290 may obtain the network information and stop the scanning process based on the received probe response fame 280.

The active scanning 250 has an advantage in that since the non-AP STA 290 dominantly performs the scanning, a time required for using the active scanning 250 in the scanning is short. However, the active scanning 250 has a disadvantage in that since the non-AP STA 290 needs to transmit the probe request frame 270, network overhead for transmission and reception of the frame increases. The probe request frame 270 is disclosed in IEEE 802.11 8.3.3.9 and the probe response fame 280 is disclosed in IEEE 802.11 8.3.3.10.

After the scanning ends, the AP and the non-AP STA may perform the authentication procedure and the association procedure.

Figure 3:
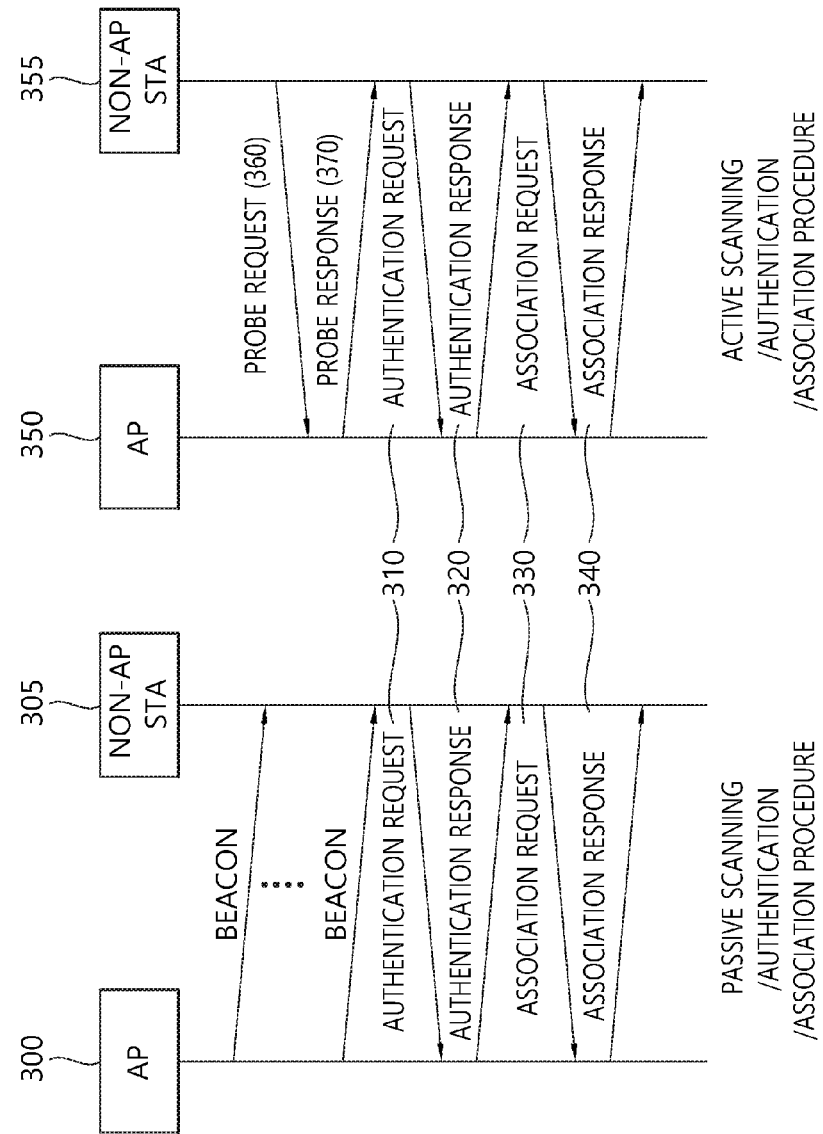
FIG. 3 is a conceptual view illustrating an authentication procedure and an association procedure performed after a scanning procedure of an AP and an STA.

FIG. 3 is a conceptual view illustrating an authentication procedure and an association procedure performed after a scanning procedure of an AP and an STA.

Referring to FIG. 3, after the passive/active scanning is performed, the authentication procedure and the association procedure with one AP among the scanned APs may be performed.

The authentication procedure and the association procedure may be performed through for example, a 2-away handshaking. The left part of FIG. 3 is a conceptual view illustrating the authentication and association procedures after the passive scanning and a right side of FIG. 3 is a conceptual view illustrating the authentication and association procedures after the active scanning.

The authentication and association procedures may be similarly performed by switching an authentication request frame 310/authentication response frame 320 and an association request frame 330/association response frame 340 between the c and the non-AP STA 305/355.

In the authentication procedure, the non-AP STA 305/355 may transmit an authentication request frame 310 to the AP 300/350. The AP 300/350 may transmit an authentication response frame 320 to the non-AP STA 305/355 as a response to the authentication request frame 310. An authentication frame format is disclosed in IEEE 802.11 8.3.3.11.

In the association procedure, the non-AP STA 305/355 may transmit an association request frame 330 to the AP 300/350. The AP 300/350 may transmit an association response frame 340 to the non-AP STA 305/355 as a response to the association request frame 330. The association request frame 330 transmitted to the AP includes information on a capability of the non-AP STA 305/355. The AP 300/350 may determine whether to support the non-AP STA 305/355 based on the capability information of the non-AP STA 305/355. When the AP 300/350 may support the non-AP STA 305/355, the AP 300/350 may transmit the association response frame 340 to the non-AP STA 305/355. The association response frame 340 may include whether the association response frame 340 is accepted and a reason of the acceptance, and capability information supportable by the AP 300/350. An association frame format is disclosed in IEEE 802.11 8.3.3.5/8.3.3.6.

After the association procedure is performed between the AP and the non-AP STA, data may be normally transmitted and received between the AP and the non-AP STA. When the association procedure between the AP and the non-AP STA is unsuccessful, the association procedure with the AP may be performed again or the association procedure with another AP may be performed based on the reason why the association is unsuccessful.

Figure 4:
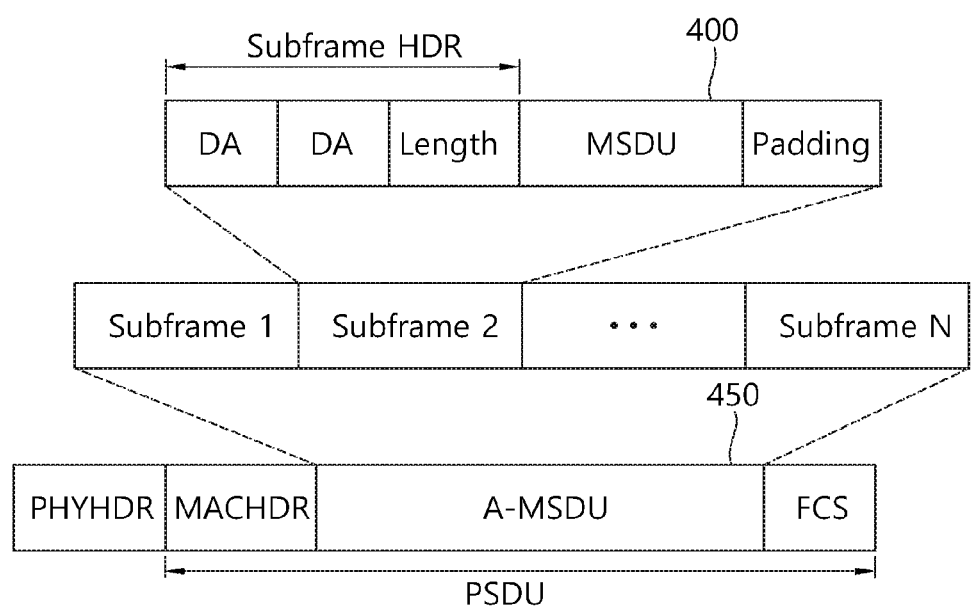
FIG. 4 is a conceptual diagram illustrating A-MSDU.

FIG. 4 is a conceptual diagram illustrating A-MSDU.

Referring to FIG. 4, as one of methods for aggregating a data frame in order to reduce MAC error overhead in IEEE 802.11n, an MAC service data unit (MSDU) 400 generated in an application layer is collected around a higher layer of an MAC layer to be generated as one MSDU. This may be defined as an aggregate-MSDU (A-MSDU) 450. Multiple MSDUs 400 having the same priority and the same receiver address (RA) are aggregated to be included in the A-MSDU 450.

Each MSDU 400 may include a subframe header including information on a destination address, a source address, and an MSDU length. An A-MSDU subframe may be padded so that a total length of the A-MSDU subframe becomes a predetermined multiple (a multiple of 4octet). One A-MSDU may include a plurality of A-MSDU subframes.

The A-MSDU 450 does not perform fragmentation differently from a single MSDU and is formed as a single QoS data MAC protocol data unit (MPDU) to be transmitted. The A-MSDU 450 may be transmitted and received among high throughput (HT) STAs. The HT STA has a capability to de-aggregate the A-MSDU 450. The HT STA may verify whether to receive the A-MSDU 450 based on a QoS field of the MAC header of the received MPDU and de-aggregate the A-MSDU.

When an ACK policy for the MPDU of the HT STA is set as a normal ACK, the A-MSDU 400 may not be aggregated to the A-MPDU. Further, whether the A-MSDU 400 may be aggregated to the A-MPDU may depend on whether a block acknowledgement agreement for each traffic identifier (TID) is made. Further, even when the block ACK agreement is made with respect to the TID, when an indicator indicating whether to support an A-MSDU block ACK of an add block acknowledgement (ADDBA) response frame at a receiving side depending on an add block acknowledgement (ADDBA) request frame indicates that the block ACK is not supported, the A-MSDU may not be included in the A-MPDU.

Figure 5:
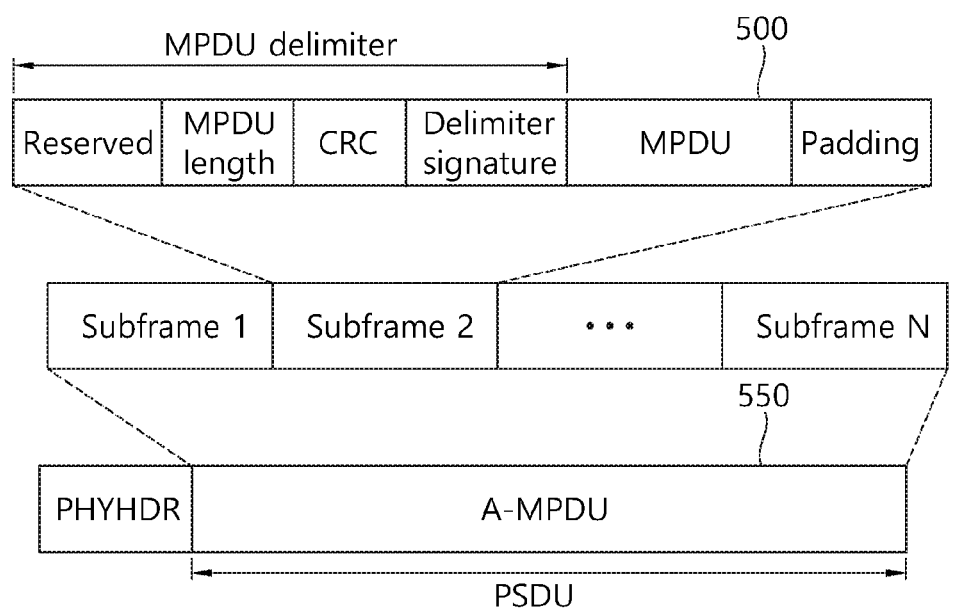
FIG. 5 is a conceptual view illustrating A-MPDU.

FIG. 5 is a conceptual view illustrating A-MPDU.

Referring to FIG. 5, a plurality of MPDUs 500 having the same receiver address (RA), and TID and ACK policy may form one A-MPDU 550 below the MAC layer.

The A-MPDU 550 may be constituted by one or more A-MPDU subframes and each A-MPDU subframe may include an MPDU delimiter and the MPDU 500. The MPDU delimiter may be used to determine whether an error occurs in the A-MPDU subframes constituting the A-MPDU 550. A plurality of A-MPUD subframes may form one A-MPDU 550.

Whether receiving the A-MPDU 550 is successful may be indicated based on the block ACK. The A-MPDU 550 may be formed only with respect to TID in which an HT-immediate BA agreement is made and values of duration/ID fields of the MPDU 500 constituting the A-MPDU 550 may be set to be the same as each other.

FIG. 6 illustrates a block ACK operation.

A block ACK mechanism is introduced to simultaneously make a response to a plurality of frames at the receiving side at the time of transmitting the plurality of frames during a TXOP period by obtaining a transmission opportunity in IEEE 802.11e. When the block ACK mechanism is used, overhead may be reduced and efficiency of the MAC layer may be improved like the A-MSDU or A-MPDU.

Referring to FIG. 6, block ACK transmission for the A-MPDU of one TID may include a setup process, a transmission process, and a tear down process.

The setup process may be a process of requesting and responding a block ACK session.

In the transmission process, consecutive data may be transmitted and an aggregated response for the consecutive data may be received.

The tear down process may cancel the set up ACK session.

In detail, in the setup process, a transmitting side and the receiving side may transmit and receive the ADDBA request frame and the ADDBA response frame, respectively. In detail, the transmitting side may transmit the ADDBA request frame as a management frame to the receiving side. The ADDBA request frame may request a block ACK agreement for a current TID. The ADDBA request frame may transmit to the receiving side information on a block ACK policy type, a transmission buffer size at the transmitting side, a timeout value of the block ACK session, a starting sequence number (SSN), and the like. The receiving side that receives the ADDBA request frame may transmit the ADDBA response frame to the transmitting side as a response to the ADDBA request frame. The ADDBA response frame may include a block ACK agreement state, an ACK policy, a buffer size, and a timeout value.

In the transmission process, the transmitting side may transmit the A-MPDU. When a transmission condition of a block ACK request (BAR) frame for the A-MPDU is met, the transmitting side may transmit the BAR frame to the receiving side. When the transmitting side successfully transmits the A-MPDU, the receiving side that receives the BAR frame may transmit the block ACK for the A-MPDU to the transmitting side.

The tear down process may be performed when a set timeout value of an inactivity timer, which is set at the receiving side expires or there is no datum to be transmitted to the corresponding TID longer. For example, in order to recover the block ACK error, with the expiration of the set timeout value of the inactivity timer, a delete block acknowledgement (DELBA) frame may be transmitted to the receiving side or the transmitting side and the block ACK session may be terminated. When the transmitting side receives the block ACK, the inactivity timer at the transmitting side may be reset. When the receiving side receives the MPDU and the bock ACK request frame, the inactivity timer at the receiving side may be reset.

FIG. 7 is a conceptual view illustrating a method for transmitting and receiving an RTS frame and a CTS frame in order to solve a hidden node problem and an exposed node problem.

Referring to FIG. 7, short signaling frames including a request to send (RTS) frame and a clear to send (CTS) frame may be used in order to solve the hidden node problem and an exposed node problem. The STA may overhear whether a frame is arbitrarily transmitted or received among neighboring STAs based on the RTS frame and the CTS frame.

The upper part of FIG. 7 illustrates a method for transmitting the RTS frame 703 and the CTS frame 705 in order to solve the hidden node problem.

Assumed that both STA A 700 and STA C 720 intend to transmit data to STA B 710, when the STA A 700 transmits the RTS frame 703 to the STA B 710, the STA B 710 may transmit the CTS frame 705 to both the STA A 700 and the STA C 720 therearound. The STA C 720 that receives the CTS frame 705 from the STA B 710 may obtain information indicating that the STA A 700 and the STA B 710 are transmitting the data. Further, the RTS frame 703 and the CTS frame 705 include a duration field including information on a period in which a wireless channel is occupied to configure a network allocation vector (NAV) so as to prevent the STA C 720 from using to use the channel during a predetermined period.

The STA C 720 stands by until transmission and reception of the data between the STA A 700 and the STA B 710 is terminated, and as a result, the STA C 720 may avoid a collision at the time of transmitting the data to the STA B 710.

The lower part of FIG. 4 illustrates a method for transmitting an RTS frame 733 and a CTS frame 705 in order to solve the exposed node problem.

STA C 750 overhears transmission of the RTS frame 733 and the CTS frame 705 by STA A 730 and STA B 740, and as a result, the STAC C 750 may find that the collision does not occur in spite of transmitting the data to another STA D 760. That is, the STA B 740 transmits the RTS frame 730 to all terminals therearound and transmits the CTS frame 735 only to the STA A 730 to which the STA B 740 actually will transmit the data. Since the STA C 750 receives only the RTS frame 733 and may not receive the CTS frame 735 of the STA A 730, the STA A 730 may find that the STA A 730 may find that the STA C 730 is out of a carrier sensing range. Therefore, the STA C 750 may transmit the data to the STA D 760.

Detailed description of the RTS frame format and the CTS frame format is disclosed in 8.3.1.2 RTS frame format and 8.3.1.3 CTS frame format of "IEEE Standard for Information Technology Telecommunications and information exchange between systems Local and metropolitan area networks Specific requirements Part 11. Wireless LAN Medium Access Control (MAC) and Physical Layer (PHY) Specifications (hereinafter, referred to as IEEE 802.11)" which is IEEE Draft P802.11-REVmb™/D12 opened in November 2011.

The CTS frame may include a frame control field, a duration field, a receiver address (RA) field, and a frame check sequence (FCS).

The RTS frame may include the frame control field, the duration field, a transmitter address (TA) field, and the frame check sequence (FCS).

Figure 8:
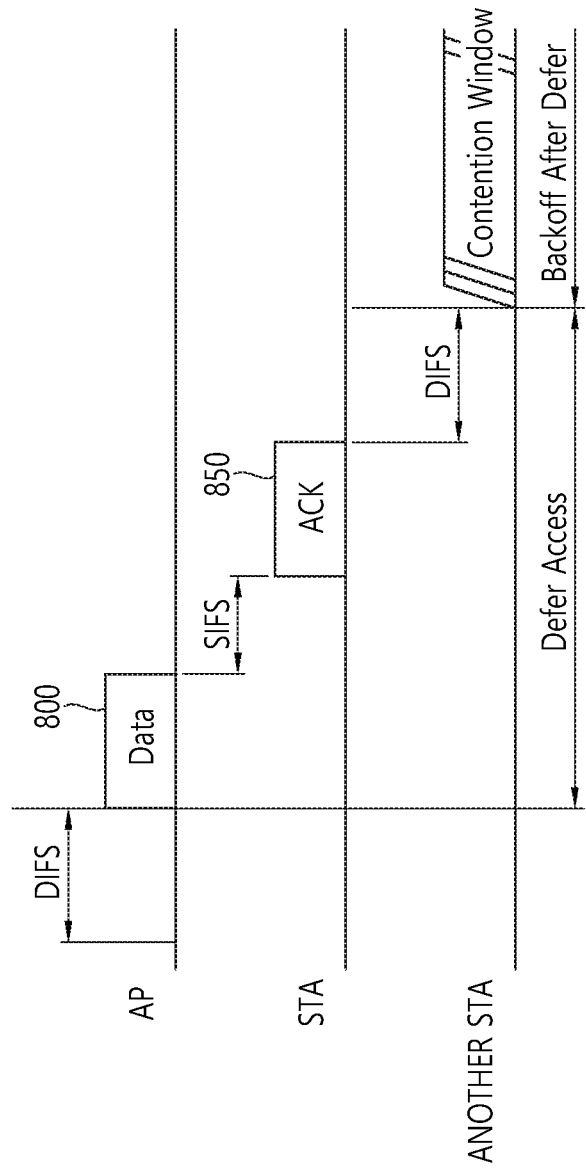
FIG. 8 is a conceptual view illustrating a procedure in unsuccessful frame transmission in the wireless LAN.

FIG. 8 is a conceptual view illustrating a procedure in unsuccessful frame transmission in the wireless LAN.

In FIG. 8, the existing frame retransmission method based on a Stop-and-Wait automatic request for repetition (ARQ) scheme is disclosed.

Referring to FIG. 8, the AP may transmit a data frame 800 to the STA. When the STA successfully receives the data frame 800, the STA may transmit an ACK frame 850 for the data frame 800 to the AP.

When the STA unsuccessfully receives the data frame 800, the STA does not transmit the ACK frame 850. When the AP may not receive the ACK frame 850 for the data frame 800 from the STA, the AP may retransmit the data frame to the STA by accessing a channel through a back-off procedure again.

The unsuccessful frame transmission may occur due to various causes. For example, the unsuccessful frame transmission may occur due to the collision of the frames or deterioration of a channel state.

Retransmission depending on the unsuccessful frame transmission of the wireless LAN in the related art is performed by assuming that the collision of the frames occurs. When the frame is retransmitted, the STA performs the backoff procedure by selecting a random backoff number included in an increased contention window. When the collision of the frames occurs, increasing the size of the contention window may reduce a probability of the collision.

However, when the unsuccessful frame transmission occurs due to the deterioration of the channel state, the increase in the size of the contention window increases a delay for the frame transmission to rather reduce data transmission efficiency. In the wireless LAN in the related art, an MCS is conservatively configured and operated in order to prevent an increase in the number of retransmission times due to the unsuccessful transmission. As an MCS index is larger, the data transmission efficiency may be higher and the STA which operates in the wireless LAN in the related art transmits data by configuring the MCS index to a value smaller than the maximum MCS index which may be used in the channel state in order to reduce retransmission.

According to the embodiment of the present invention, when the unsuccessful frame transmission (for example, a CRC decoding error at a receiving end) occurs due to the collision with another STA, a frame retransmission procedure based on ARQ may be used. In the case where the unsuccessful frame transmission occurs due to the collision with another STA, when the HARQ based frame retransmission procedure is used, a collision possibility between the STA and another STA may occur again. Therefore, when the unsuccessful frame transmission occurs due to the collision with another STA, the ARQ based frame retransmission procedure may be used.

On the contrary, when the unsuccessful frame transmission occurs due to the deterioration (for example, the low SNR) of the channel state, the HARQ based frame retransmission procedure may be effective.

In a communication system, a technique for controlling a transmission error may be generally divided into two types. Two types are a forward error correction (FEC) based error control method and an automatic repeat request (ARQ) based error control method.

When the FEC based error control method is used, the receiving end attempts to correct the detected error and when the receiving end successfully corrects the error, correct data is decoded. However, when the receiving end unsuccessfully corrects the error, the receiving end may receive wrong information or omit information. In detail, when the FEC based error control method is used, relatively low efficiency may be obtained in the case where a channel environment is excellent. Further, when the receiving end unsuccessfully corrects the error, data is not retransmitted, reliability of the communication system is reduced.

When the ARQ based error control method is used, the receiving end may receive data including a code having a high error detection capability and when the error is detected, the receiving end may request retransmission to the transmitting end. When the ARQ based error control method is used, the system may guarantee high reliability and perform efficient transmission with low redundancy. However, the ARQ based error control method may paralyze the system by a lot of retransmission requests depending on deterioration of the channel environment.

Disadvantages of the FEC based error control method and the ARQ based error control method may be solved by using HARQ in which two techniques are appropriately associated.

When the HARQ based error control method is used, the receiving end attempts the error correction for the received data and determines whether the retransmission is requested based on a simple error detection code such as cyclic redundancy check (CRC). That is, the error correction and the retransmission may be simultaneously performed. An HARQ technique may be divided into a chase combining method, an incremental redundancy (IR) method, and the like.

According to the embodiment of the present invention, when the unsuccessful frame transmission occurs due to the deterioration (for example, the low signal to noise ratio (SNR)) of the channel state, the HARQ based frame retransmission may be performed. That is, chase combining (CC) and/or incremental redundancy (IR) based HARQ may be performed in order to recover the error of the data frame transmitted/received between the STA and the AP.

When the data frame is retransmitted based on the CC, the retransmitted data may be the same as the previously transmitted data. A receiver may combine the previously received data and the retransmitted data based on maximum-ration combining (MRC) and input combined data in a decoder. Since the retransmitted data is the same as the previously transmitted data, the CC based retransmission may be regarded as additional repetition coding.

When the data frame is retransmitted based on the IR, the retransmitted data may not be the same as the previously transmitted data. For example, the retransmitted data and the previously transmitted data may be data which are differently coded. The retransmitted data may include a parity bit which is not included in the previously transmitted data.

Hereinafter, in an embodiment of the present invention, a HARQ-based frame retransmission procedure in a WLAN will be described.

Figure 9:
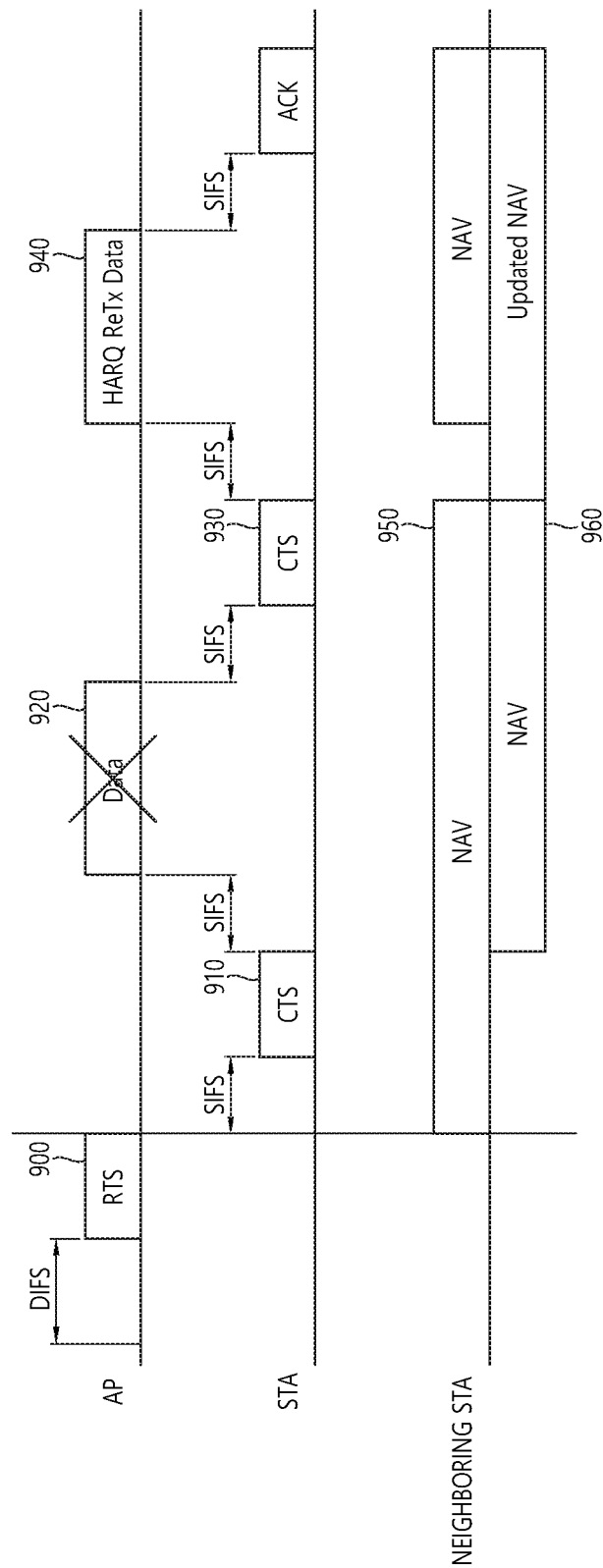
FIG. 9 is a conceptual view illustrating a frame retransmission procedure according to an embodiment of the present invention.

FIG. 9 is a conceptual view illustrating a frame retransmission procedure according to an embodiment of the present invention.

In FIG. 9, when a frame is a single MPDU, the frame retransmission procedure starts. In the embodiment of the present invention, in order to exclude a possibility of collision with another frame of a data frame (alternatively, a management frame), first, a transmission procedure of an RTS frame 900/a CTS frame 910 may be performed.

Hereinafter, in the embodiment of the present invention, for convenience of description, it is assumed that the AP transmits the RTS frame 900 and the data frame 920 (alternatively, the management frame). However, the STA may transmit the RTS frame and the data frame (alternatively, the management frame), and the embodiment is also included in the scope of the present invention. Further, hereinafter, in the embodiment of the present invention, the retransmission procedure for the data frame is described, but the retransmission procedure for the management procedure other than the data frame may also be equally performed.

Referring to FIG. 9, the AP may transmit the RTS frame 900 to the STA. The STA that receives the RTS frame 900 may transmit the CTS frame 910 to the AP after a short interframe space (SIFS).

The AP and a neighboring STA around the STA may configure a network allocation vector (NAV) based on the RTS frame 900/the CTS frame 910. A first NAV 950 may be configured based on the RTS frame 900, and a second NAV 960 may be configured based on the CTS frame 910. The first NAV 950 and the second NAV 960 may be configured by considering up to a time resource for the data frame 920 and the ACK frame that are transmitted after the RTS frame 900/the CTS frame 910.

The AP receiving the CTS frame 910 may transmit the data frame 920 to the STA. The STA may anticipate the data frame 920 which is transmitted from the AP after the transmission of the CTS frame 910. The data frame which is first transmitted after transmitting the RTS frame 900 may be expressed as the term of the initial data frame 920. The transmission/reception of the RTS frame 900/the CTS frame 910 between the AP and the STA do not consider a TXOP for a retransmission data frame to be described below and may be used for acquiring the TXOP for only the initial data frame 920.

According to the embodiment of the present invention, when the STA unsuccessfully decodes the received initial data frame 920 or does not receive the initial data frame 920 after transmitting the CTS frame 910, the STA may retransmit a CTS frame 930 to the AP. For example, the decoding error for the received initial data frame 920 may occur or the initial data frame 920 may be unsuccessfully received. In this case, the STA may retransmit the CTS frame 930 for requesting the retransmission for the initial data frame 920 after the SIFS to the AP at the time of expecting the transmission completion of the initial data frame 920 by considering transmission duration of the initial data frame 920.

The CTS frame 930 for requesting the retransmission for the initial data frame 920 may be expressed as the term of a retransmission request CTS frame (alternatively, a retransmission request frame). That is, the retransmission request CTS frame 930 may be used for signaling an NACK for the initial data frame 920.

The transmission timing of the retransmission request CTS frame 930 may be acquired based on a duration field of the RTS frame 900 transmitted by the AP. The duration field of the RTS frame 900 may include information on duration for transmitting the RTS frame 900, the CTS frame 910, the initial data frame 920, and the ACK frame for the initial data frame 920. The STA may determine a transmission completion timing of the initial data frame 920 based of the duration field of the RTS frame 900 and transmit the retransmission request CTS frame 930 after the SIFS, after the transmission completion timing of the initial data frame 920.

Alternatively, the transmission timing of the retransmission request CTS frame 930 may be acquired based on a length field included in a PLCP header of the PPDU transferring the initial data frame 920 and/or the duration field of an MAC header of the initial data frame 920. For example, the STA may determine the transmission completion timing (alternatively, an expected transmission completion timing) of the initial data frame 920 based on information regarding the length of the initial data frame 920 included in the length field and/or the coding of the initial data frame 920 and the like, or determine the transmission completion timing (alternatively, the expected transmission completion timing) of the initial data frame 920 based on the duration filed of the MAC header. The STA may transmit the retransmission request CTS frame 930 after the SIFS, after the transmission completion timing of the initial data frame 920. As another expression, the transmission timing of the retransmission request frame may be after the SIFS based on the expected transmission completion timing. The SIFS may be a time resource corresponding to 10 micro seconds (ms).

The duration field of the retransmission request CTS frame 930 may include duration (alternatively, TXOP) information for transmission of a retransmission data frame 940 and an ACK frame for the retransmission data frame 940. The TXOP for the retransmission data frame 940 may be acquired based on the duration field of the retransmission CTS frame 930. On similar transmission coverage, for the transmission of the retransmission CTS frame 930, an MCS index of the retransmission CTS frame 930 may be configured to be same as the MCS index used for the transmission of the RTS frame 900 and/or the CTS frame 910 and transmitted.

For requesting the retransmission to the AP, a separate frame other than the retransmission CTS frame 930 may be newly defined. For example, various format frames including the NACK frame, the modified ACK frame, and the like may be used for the request of the retransmission to the AP. When the initial data frame 920 is an A-MPDU format, a block ACK frame may be used for requesting the transmission for the retransmission data frame 940. That is, the block ACK frame may be used for signaling the NACK for the received initial data frame 920. A retransmission method when the initial data frame 920 is the A-MPDU format will be described below in detail.

The AP may receive the retransmission request CTS frame 930 transmitted by the STA and transmit the retransmission data frame 940 after the SIFS. The retransmission data frame 940 may be a data frame having the same format including the same data as the initial data frame 920. Alternatively, the retransmission data frame 940 includes the same data as the initial data frame 920 that is previously transmitted and may be generated based on another MAC index. For example, the MCS index applied to the retransmission data frame 940 may be lower than the MCS index applied to the initial data frame 920 that is previously transmitted. Alternatively, the retransmission data frame 940 may include redundancy bits for a different error recovery from the initial data frame 920. That is, the redundancy bits for the error recovery included in the initial data frame 920 may be different from the redundancy bits for the error recovery included in the retransmission data frame 940.

When a neighboring STA receives the retransmission CTS frame 930, the neighboring STA may update and extend the NAV configured based on the duration field of the retransmission CTS frame 930. Further, the neighboring STA receiving the retransmission data frame 940 may configure the NAV based on the duration field of the retransmission data frame 940.

The retransmission for the above data frame may be repetitively performed until the ACK frame for the data frame is received from the STA or for a predetermined threshold number of times. When the retransmission for the above data frame is repeated, the aforementioned retransmission data frame 940 becomes a primary retransmission frame, and a secondary retransmission frame which is a retransmission frame for the primary retransmission frame may be transmitted to the STA from the AP. The STA may retransmit the retransmission CTS frame to the AP for the request of the secondary retransmission frame.

Figure 10:
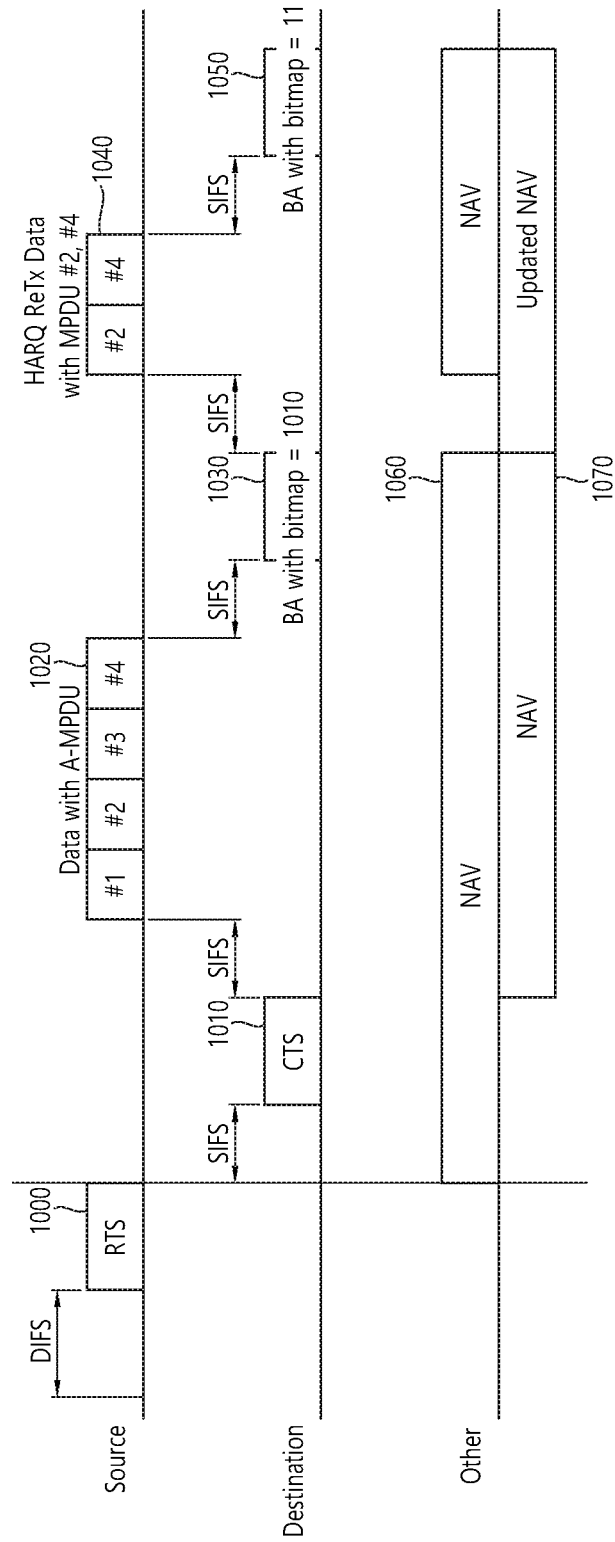
FIG. 10 is a conceptual view illustrating a frame retransmission procedure according to an embodiment of the present invention.

FIG. 10 is a conceptual view illustrating a frame retransmission procedure according to an embodiment of the present invention.

In FIG. 10, when the data frame is an A-MPDU format, the retransmission procedure for the data frame starts.

Referring to FIG. 10, the AP may transmit a RTS frame 1000 to the STA. The STA that receives the RTS frame 1000 may transmit a CTS frame 1010 to the AP after the SIFS.

The AP and a neighboring STA around the STA may configure a NAV based on the RTS frame 1000/the CTS frame 1010. A first NAV 1060 may be configured based on the RTS frame 1000, and a second NAV 1070 may be configured based on the CTS frame 1010. The first NAV 1060 and the second NAV 1070 may be configured by considering up to a time resource for the data frame 1020 of the A-MPDU format and the ACK frame that are transmitted after the RTS frame 1000/the CTS frame 1010.

The AP receiving the CTS frame 1010 may transmit the data frame 1020 of the A-MPDU format to the STA. The STA may monitor the data frame 1020 of the A-MPDU format which is to be transmitted from the AP after the transmission of the CTS frame 1010.

The data frame 1020 of the A-MPDU format which is initially transmitted after transmitting the RTS frame 1000 may be expressed as the term of an A-MPDU format initial data frame. The transmission/reception of the RTS frame 1000/the CTS frame 1010 between the AP and the STA do not consider a TXOP for an A-MPDU format retransmission data frame 1040 to be described below and may be used for acquiring the TXOP for only the A-MPDU format initial data frame 1020.

According to the embodiment of the present invention, when the STA unsuccessfully decodes some MPDUs included in the received A-MPDU format initial data frame 1020, the STA may transmit the block ACK frame 1030 for indicating some MPDUs which are unsuccessfully decoded to the AP.

For example, the received A-MPDU format initial data frame 1020 may include MPDU#1, MPDU#2, MPDU#3, and MPDU#4. When the STA decodes the A-MPDU format initial data frame 1020, MPDU#2 and MPDU#4 may be unsuccessfully decoded. In this case, the STA may indicate MPDU#2 and MPDU#4 which are unsuccessfully decoded based on an error indicator field of the block ACK. The error indicator field may be used for indicating the MPDU having the error among the plurality of MPDUs included in the A-MPDU. That is, the block ACK frame may be used for signaling the NACK for at least one MPDU included in the received A-MPDU format initial data frame 1020.

The block ACK 1030 used for signaling the NACK for the A-MPDU format initial data frame 1020 may be expressed as the term of the retransmission request block ACK (alternatively, a retransmission request frame).

For example, based on a bit map, the MPDU which is successfully decoded among the MPDUs included in the A-MPDU may be indicated as '1', and the MPDU which is unsuccessfully decoded among the MPDUs included in the A-MPDU may be indicated as '0'. Like FIG. 7, a bit map '1010' of the error indicator field may indicate MPDU#2 and MPDU#4 that are unsuccessfully decoded.

The AP may receive a retransmission request block ACK 1030 and transmit an A-MPDU format retransmission data frame 1040 including MPDU#2 and MPDU#4 which are indicated by the error indicator field after the SIFS. The STA may receive the A-MPDU format retransmission data frame 1040 and transmit a block ACK 1050 to the AP again in response to the A-MPDU format retransmission data frame 1040. If the A-MPDU format retransmission data frame 1040 is unsuccessfully decoded, the block ACK 1050 may be a retransmission request block ACK. The A-MPDU format initial data frame 1020 may be expressed as the term of the initial data frame, and the A-MPDU format retransmission data frame 1040 may be expressed as the term of the retransmission data frame.

In the case of one MPDU in which the error occurs, a single MDPU format retransmission data frame may be transmitted, or aggregated together with a different MPDU from the MPDU in which the error occurs to be transmitted to the A-MPDU format data frame.

Further, when the STA does not receive the A-MPDU format initial data frame 1020 or when all MPDUs included in the A-MPDU format initial data frame 1020 are unsuccessfully decoded, as illustrated in FIG. 6, the STA may transmit the retransmission CTS frame to the AP. The AP receiving the retransmission CTS frame may transmit the A-MPDU format retransmission data frame including all of the MPDUs included in the A-MPDU format initial data frame.

The MPDU included in the A-MPDU format retransmission data frame may be the same data format as the MPDU included in the A-MPDU format initial data frame. Alternatively, the MPDU included in the A-MPDU format retransmission data frame includes the same data format as the MPDU included in the A-MPDU format initial data frame and a data unit based on another MCS. For example, the MCS index applied to the MPDU included in the A-MPDU format retransmission data frame may be lower than the MCS index applied to the MPDU included in the A-MPDU format initial data frame which is previously transmitted.

Alternatively, a redundancy bit for restoring the error for the MPDU included in the A-MPDU format retransmission data frame and a redundancy bit for restoring the error for the MPDU included in the A-MPDU format initial data frame may be different from each other. That is, a redundancy bit for the error recovery included in the A-MPDU format initial data frame may be different from a redundancy bit for the error recovery included in the A-MPDU format retransmission data frame.

The retransmission request block ACK 1030 may include a duration field, and the neighboring STA may configure the NAV or update the NAV based on the duration field of the retransmission request block ACK 1030. For example, the duration field of the retransmission request block ACK 1030 may include information on duration for transmitting the A-MPDU format retransmission data frame 1020 and a block ACK 1050 for the A-MPDU format retransmission data frame 1020. A TXOP for the A-MPDU format retransmission data frame 1040 and a block ACK 1050 for the A-MPDU format retransmission data frame may be acquired based on the duration field of the retransmission request block ACK 1030.

Further, the A-MPDU format retransmission data frame 1040 may include a duration field, and a neighboring STA may configure or update the NAV based on the duration field of the A-MPDU format retransmission data frame 1040. The duration field of the A-MPDU format retransmission data frame 1040 may include information on the duration for the transmission of the block ACK 1050 for the A-MPDU format retransmission data frame 1040. The TXOP for the A-MPDU format retransmission data frame 1040 and the block ACK 1050 for the A-MPDU format retransmission data frame 1040 may be acquired based on the duration field of the A-MPDU format retransmission data frame 1040.

Figure 11:
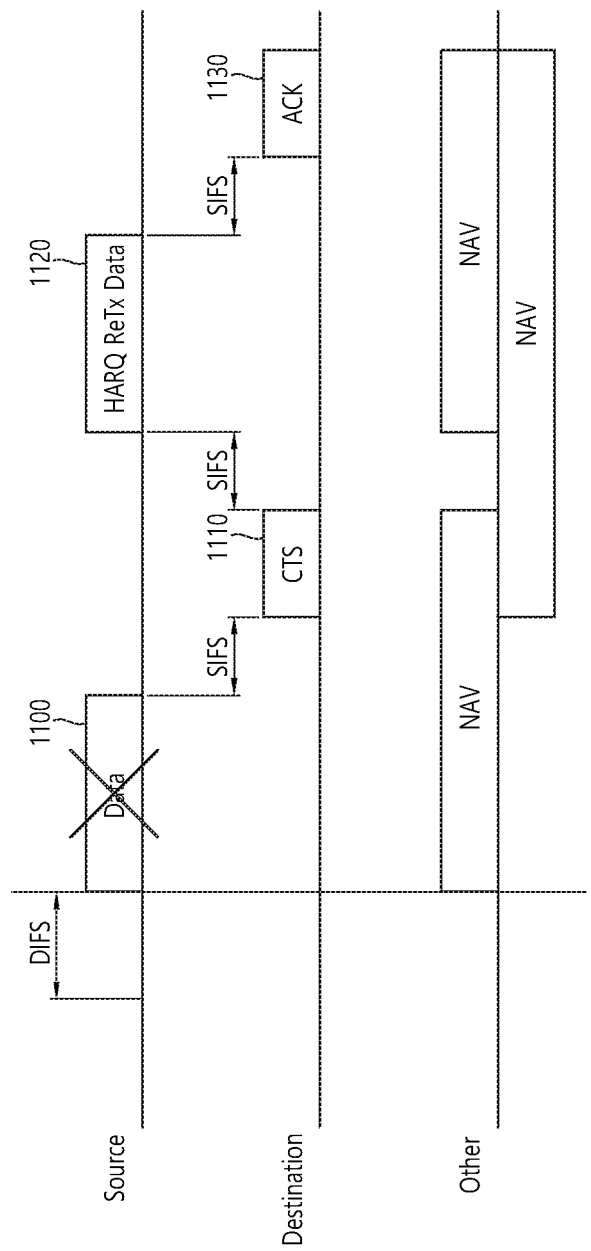
FIG. 11 is a conceptual view illustrating a frame retransmission procedure according to an embodiment of the present invention.

FIG. 11 is a conceptual view illustrating a frame retransmission procedure according to an embodiment of the present invention.

In FIG. 11, when the frame is a single MPDU, the frame retransmission procedure performed without the transmission procedure of the RTS frame/CTS frame starts.

Referring to FIG. 11, the STA may receive the initial data frame from the AP.

It may be assumed that the PLCP header of the PPDU 1100 transferring the initial data frame received by the STA is successfully decoded, but the MPDU (alternatively, PSDU) after the PLCP header is unsuccessfully decoded.

In this case, the STA may determine the duration of the PPDU 1100 based on the L-SIG included in the PLCP header. For example, the transmission completion time of the PPDU 1100 may be determined based on data rate and length information included in the L-SIG.

The STA may transmit the retransmission CTS frame 1110 after the SIFS at the time of completing transmission of the PPDU 1100. The AP that receives the retransmission CTS frame 1110 may transmit the retransmission data frame 1120 to the STA after the SIFS. The STA may transmit the ACK frame 1130 to the AP after the SIFS when receiving the retransmission data frame 1120 and successfully decoding the retransmission data frame 1120. When the retransmission data frame 1120 is also unsuccessfully decoded, the retransmission CTS frame may be transmitted again by considering the time of completing the transmission of the retransmission data frame 1120.

The neighboring STA may configure or update the NAV based on at least one of the initial data frame 1100, the retransmission frame 1110, and the retransmission frame 1120 which are received.

According to the embodiment of the present invention, whether to perform the HARQ based frame retransmission operation disclosed in FIGS. 6 to 8 may be configured through the initial access procedure of the AP of the STA.

Figure 12:
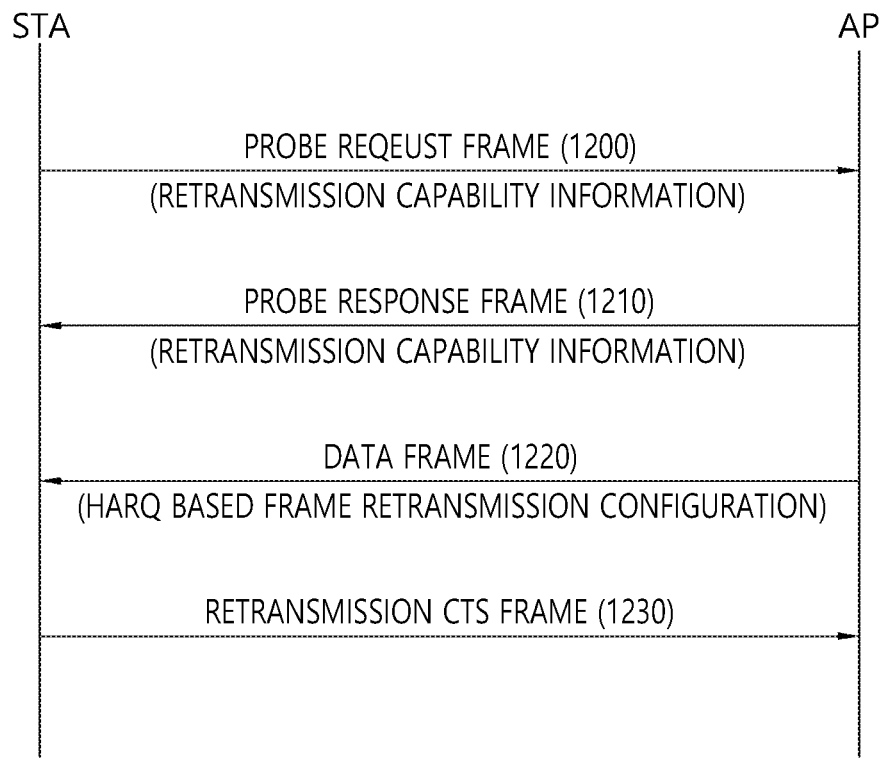
FIG. 12 is a flowchart illustrating an HARQ based frame retransmission procedure according to an embodiment of the present invention.

FIG. 12 is a flowchart illustrating an HARQ based frame retransmission procedure according to an embodiment of the present invention.

In FIG. 12, a method for configuring the HARQ based frame retransmission procedure through an initial access procedure and a method for configuring whether the HARQ based frame retransmission procedure is applied in the frame transmission procedure are disclosed.

Referring to FIG. 12, the HARQ based frame retransmission procedure between the AP and the STA may be configured through initial access frame exchange on the initial access procedure (a scanning procedure, an authentication procedure, and an association procedure).

For example, the STA may transmit to the AP information (for example, retransmission capability information) for an HARQ based frame transmission operation through a probe request frame 1200 in the scanning procedure. The AP may also transmit to the STA the capability information for the HARQ based frame retransmission operation through a beacon frame and/or probe response frame 1210.

Alternatively, the STA may transmit to the AP the capability information for the HARQ based frame retransmission operation through the association request frame transmitted in the association procedure. The AP may also transmit to the STA the capability information for the HARQ based frame retransmission operation through the association response frame.

As another method, the AP or STA may request the HARQ based frame retransmission and approve or deny the HARQ based frame retransmission request through the initial access frame exchanged in the initial access procedure. That is, the initial access frame exchanged in the initial access procedure may include a field (alternatively, an indicator) for requesting the HARQ based frame retransmission or a field (alternatively, an indicator) for approving or denying the request for the HARQ based frame retransmission.

When the HARQ based frame retransmission procedure is performed between the STA and the AP, it may be determined whether the HARQ based frame retransmission is performed for each data frame (alternatively, management frame). For example, the data frame 1220 may include HARQ based frame retransmission configuration information and the STA may determine whether to transmit a retransmission CTS frame 1230 based on the HARQ based frame retransmission configuration information included in the data frame 1220.

For example, in an implicit method, when the RTS frame and the CTS frame are exchanged with each other, the HARQ based frame retransmission may be performed. For example, the STA and the AP may operate to perform the HARQ based frame retransmission during TXOP duration obtained based on the exchange between the RTS frame and the CTS frame.

As another example, in an explicit method, an indicator included in the PPDU header (PHY header or PHY preamble) may include information indicating whether the HARQ based frame retransmission procedure is permitted. For example, HE-SIG included in the PPDU header transferring the data frame (alternatively, management frame) may include an indicator indicating whether to perform the HARQ. The STA that receives the data frame (alternatively, management frame) may determine whether to request retransmission of an HARQ based data frame (alternatively, management frame) based on the HE-SIG included in the PPDU header.

Figure 13:
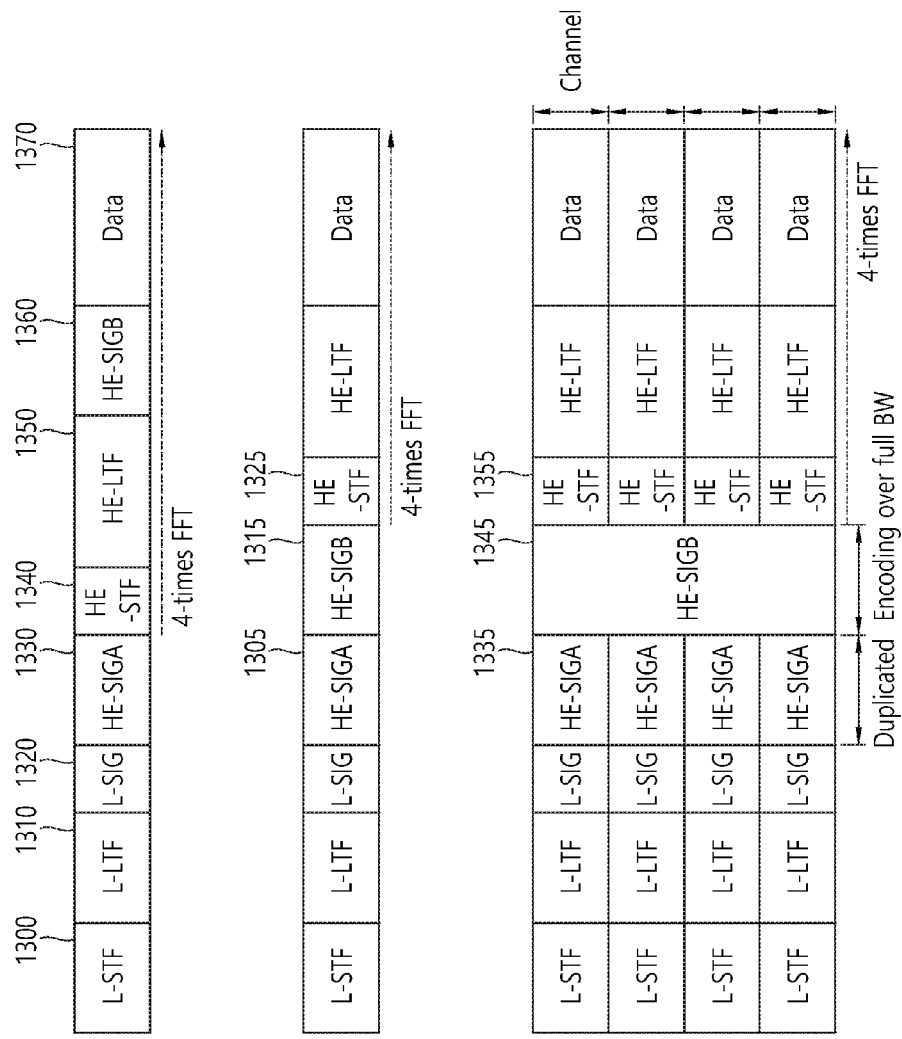
FIG. 13 is a conceptual view illustrating a PPDU format for HARQ based retransmission according to an embodiment of the present invention.

FIG. 13 is a conceptual view illustrating a PPDU format for HARQ based retransmission according to an embodiment of the present invention.

The PHY header of the PPDU format for the HARQ based retransmission may include information indicating whether the HARQ based retransmission is performed.

Referring to the upper part of FIG. 13, the PHY header of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). From the PHY header to the L-SIG may be classified into a legacy part, a high efficiency (HE) part after the L-SIG.

An L-STF 1300 may include a short training orthogonal frequency division multiplexing (OFDM) symbol. The L-STF 1300 may be used for frame detection, automatic gain control (AGC), diversity detection, and coarse frequency/time synchronization.

An L-LTF 1320 may include a long training orthogonal frequency division multiplexing (OFDM) symbol. The L-LTF 1320 may be used for fine frequency/time synchronization and channel prediction.

An L-SIG 1340 may be used for transmitting control information. The L-SIG 1340 may include information regarding a data rate and a data length.

According to the embodiment of the present invention, an HE-SIG A 1330 may include information indicating whether HARQ based retransmission is performed. For example, when the HARQ based retransmission for the PPDU is supported, the indicator indicating whether the HARQ based retransmission is performed may have a value of 1 and when the HARQ based retransmission for the PPDU is not supported, the indicator indicating whether the HARQ based retransmission is performed may have a value of 0.

An HE-STF 1340 may be used for improving automatic gain control estimation in an MIMO environment or an OFDMA environment.

An HE-LTF 1350 may be used for estimating a channel in the MIMO environment or the OFDMA environment.

AHE-SIG B 1360 may include information on a length modulation and coding scheme (MCS) of the physical layer service data unit (PSDU) for each STA, a tail bit, and the like.

The size of inverse fast Fourier transform (IFFT) applied to the HE-STF 1340 and the field after the HE-STF 1340, and the size of the IFFT applied to the field before the HE-STF 1340 may be different from each other. For example, a size of the IFFT applied to the HE-STF 1340 and the field after the HE-STF 1340 may be four times larger than the size of the IFFT applied to the field before the HE-STF 1340. The STA may receive the HE-SIG-A 1330 and may be instructed to receive the downlink PPDU based on the HE-SIG-A 1330. In this case, the STA may perform decoding based on the FFT size changed from the HE-STF 1340 and the field after the HE-STF 1340. On the contrary, when the STA may not be instructed to receive the downlink PPDU based on the HE-SIG A 1330, the STA may stop the decoding and configure a network allocation vector (NAV). A cyclic prefix (CP) of the HE-STF 1340 may have a larger size than the CP of another field and the during the CP period, the STA may perform the decoding for the downlink PPDU by changing the FFT size.

An order of the field configuring the format of the PPDU illustrated in the upper part of FIG. 13 may be changed. For example, as illustrated in the stop of FIG. 13, an HE-SIG B 1315 of the HE part may be positioned immediately after the HE-SIG A 1305. The STA decodes up to the HE-SIG A 1305 and the HE-SIG B 1315 and receives required control information to set the NAV. Similarly, the size of the IFFT applied to the HE-STF 1325 and the field after the HE-STF 1325 may be the same as the size of the IFFT applied to the field before the HE-STF 1325.

The STA may receive the HE-SIG A 1305 and the HE-SIG B 1315. When the reception of the downlink PPDU is indicated by the identifier field of the STA of the HE-SIG A 1305, the STA may perform the decoding for the downlink PPDU by changing the FFT size from the HE-STF 1325. On the contrary, when the STA receives the HE-SIG A 1305 and the reception of the downlink PPDU based on the HE-SIG A 1305 is not indicated, the NAV may be set.

Referring to the lower part of FIG. 13, the downlink PPDU formation of downlink (DL) multi-user (MU) transmission is illustrated. The downlink PPDU may be transmitted to the STA through a different downlink transmission resource (a frequency resource or a spatial stream).

When downlink transmission is performed to a plurality of STAs through different frequency resources, on the downlink PPDU, a previous field of the HE-SIG B 1345 may be transmitted from a different downlink transmission resource in a duplicated form. The HE-SIG B 1345 may be transmitted in an encoded form on the entire transmission resource. A field after the HE-SIG B 1345 may include individual information for the plurality of STAs receiving the downlink PPDU.

When the field included in the downlink PPDU is transmitted through the downlink transmission resource, the CRC for each field may be included in the downlink PPDU. On the contrary, when a specific field included in the downlink PPDU is encoded on the entire downlink transmission resource and transmitted, the CRC for each field may not be included in the downlink PPDU. Accordingly, the overhead for the CRC may be reduced. That is, the downlink PPDU format for the DL MU transmission according to the embodiment of the present invention uses the HE-SIG B 1345 in the encoded form on the entire transmission resource to reduce the CRC overhead of the downlink frame.

For example, it is assumed that the AP transmits the downlink PPDU through the DL MUL OFDMA transmission. When one channel bandwidth is 20 MHz, the STA that receives the downlink PPDU receives and decodes the HE-SIG A transmitted through 20 MHz to be allocated with the downlink transmission resource. According to the embodiment of the present invention, each HE-SIG A may include downlink transmission resource allocation information for the STA and the indicator indicating whether the HARQ based retransmission of the PPDU is performed through the downlink transmission resource.

Further, the STA may receive and decode the HE-SIG B 1345 transmitted through an 80 MHz channel and receive the downlink PPDU transmitted through the allocated downlink transmission resource from the field after the HE-SIG B 1345.

Like the downlink PPDU format for the DL MU transmission, the HE-STF 1355 and the field after the HE-STF 1355 may be encoded based on the different IFFT size from the field before the HE-STF 1355. Accordingly, when the STA receives the HE-SIG A 1335 and the HE-SIG B 1345 and indicates the reception of the downlink PPDU based on the HE-SIG A 1335, the STA may perform the decoding for the downlink PPDU by changing the FFT size from the HE-STF 1355.

Figure 14:
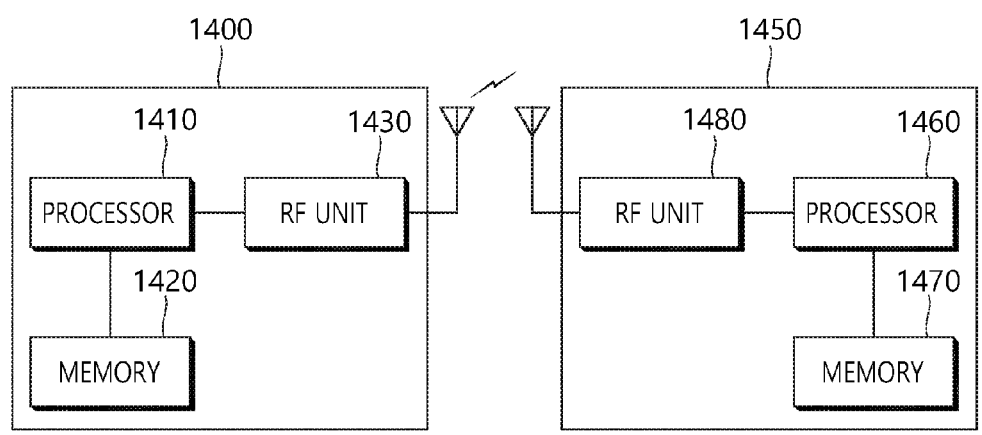
FIG. 14 is a block diagram illustrating a wireless apparatus to which an embodiment of the present invention can be applied.

FIG. 14 is a block diagram illustrating a wireless apparatus to which an embodiment of the present invention can be applied.

Referring to FIG. 14, the wireless apparatus 1000 as an STA capable of implementing the aforementioned embodiment may be an AP 1400 or a non-AP station (alternatively, STA) 1450.

The AP 1400 may include a processor 1410, a memory 1420, and a radio frequency (RF) unit 1430.

The RF unit 1430 is connected with the processor 1410 to transmit/receive the radio signal.

The processor 1410 implements a function, a process, and/or a method which are proposed in the present invention. For example, the processor 1410 may be implemented to perform the operation of the wireless apparatus according to the embodiment of the present invention. The processor may perform the operation of the wireless apparatus disclosed in the embodiment of FIGS. 9 to 13.

For example, when the processor 1410 receives the retransmission request frame for the initial data frame from the STA, the processor 1410 may transmit the retransmission data frame for the initial data frame.

The STA 1450 may include a processor 1460, a memory 1470, and a radio frequency (RF) unit 1480.

The RF unit 1480 is connected with the processor 1460 to transmit/receive the radio signal.

The processor 1460 implements a function, a process, and/or a method which are proposed in the present invention. For example, the processor 1420 may be implemented to perform the operation of the wireless apparatus according to the embodiment of the present invention. The processor may perform the operation of the wireless apparatus disclosed in the embodiment of FIGS. 9 to 13.

For example, the processor 1460 may receive the RTS frame from the AP and transmit the CTS frame to the AP as a response to the RTS frame and receive the initial data frame from the AP after transmitting the CTS frame. Further, the processor 1460 may be implemented to transmit the retransmission request frame to the AP and receive the retransmission data frame from the AP as a response to the retransmission request frame. The retransmission data frame may be a retransmission frame for the initial data frame.

The processors 1410 and 1460 may include an application-specific integrated circuit (ASIC), other chipset, a logic circuit, a data processing device, and/or a converter that converts a baseband signal and the radio signal to each other. The memories 1420 and 1470 may include a read-only memory (ROM), a random access memory (RAM), a flash memory, a memory card, a storage medium, and/or other storage devices. The RF units 1430 and 1480 may include one or more antennas that transmit and/or receive the radio signal.

When the embodiment is implemented by software, the aforementioned technique may be implemented by a module (a process, a function, and the like) that performs the aforementioned function. The module may be stored in the memories 1420 and 1470 and executed by the processors 1410 and 1460. The memories 1420 and 1470 may be positioned inside or outside the processors 1410 and 1460 and connected with the processors 1410 and 1460 through various well-known means.

What is claimed is:

1. A retransmission method in a wireless local area network (WLAN), comprising:
   receiving, by a station (STA), a request to send (RTS) frame from an access point (AP);
   transmitting, by the STA, a clear to send (CTS) frame to the AP as a response to the RTS frame;
   receiving, by the STA, an initial data frame from the AP after transmitting the CTS frame;
   transmitting, by the STA, a retransmission request frame to the AP when decoding the initial data frame is failed; and
   receiving, by the STA, a retransmission data frame from the AP as a response to the retransmission request frame,
   wherein the initial data frame is generated in a first aggregated-medium access control (MAC) protocol data unit (A-MPDU) format including a plurality of MPDUs,
   wherein the retransmission request frame is a retransmission request block ACK frame for the initial data frame, and
   wherein the retransmission request block ACK frame includes a bitmap including a first bit and a second bit, the first bit indicating an MPDU which is successfully decoded among the plurality of the MPDUs, and the second bit indicating an MPDU which is unsuccessfully decoded among the plurality of the MPDUs, and
   wherein if a number of the MPDUs indicated by the second bit is at least one, the retransmission data frame is generated in a second A-MPDU format in which the MPDUs indicated by the second bit are aggregated.

2. The method of claim 1, wherein the retransmission request frame is a frame having the same format as the CTS frame.

3. The method of claim 1, wherein a transmission time of the retransmission request frame is determined based on an anticipation transmission end time of the initial data frame,
   the anticipation transmission end time is determined based on a duration field included in the RTS frame, and
   the duration field includes information on duration for transmitting the CTS frame, the initial data frame, and an acknowledgement (ACK) frame for the initial data frame.

4. The method of claim 3, wherein the transmission time of the retransmission request frame is after a short interframe symbol (SIFS) based on the anticipation transmission end time.

5. A station (STA) performing retransmission in a wireless local area network (WLAN), the STA comprising:
   a radio frequency (RF) unit implemented to transmit or receive a radio signal; and
   a processor operatively connected with the RF unit,
   wherein the processor is implemented to
      receive a request to send (RTS) frame from an access point (AP),
      transmit a clear to send (CTS) frame to the AP as a response to the RTS frame,
      receive an initial data frame from the AP after transmitting the CTS frame,
      transmit a retransmission request frame to the AP when decoding the initial data frame is failed, and
      receive a retransmission data frame from the AP as a response to the retransmission request frame,
   wherein the initial data frame is generated in a first aggregated-medium access control (MAC) protocol data unit (A-MPDU) format including a plurality of MPDUs,
   wherein the retransmission request frame is a retransmission request block ACK frame for the initial data frame, and
   wherein the retransmission request block ACK frame includes a bitmap including a first bit and a second bit, the first bit indicating an MPDU which is successfully decoded among the plurality of the MPDUs, and the second bit indicating an MPDU which is unsuccessfully decoded among the plurality of the MPDUs, and
   wherein if a number of the MPDUs indicated by the second bit is at least one, the retransmission data frame is generated in a second A-MPDU format in which the MPDUs indicated by the second bit are aggregated.

6. The STA of claim 5, wherein the retransmission request frame is a frame having the same format as the CTS frame.

7. The STA of claim 5, wherein a transmission time of the retransmission request frame is determined based on an anticipation transmission end time of the initial data frame,
   the anticipation transmission end time is determined based on a duration field included in the RTS frame, and
   the duration field includes information on duration for transmitting the CTS frame, the initial data frame, and an acknowledgement (ACK) frame for the initial data frame.

8. The STA of claim 7, wherein the transmission time of the retransmission request frame is after a short interframe symbol (SIFS) based on the anticipation transmission end time.

* * * * *